F. M. CROSS.
AUTOMOBILE WHEEL.
APPLICATION FILED MAR. 12, 1915.
1,181,372. Patented May 2, 1916.
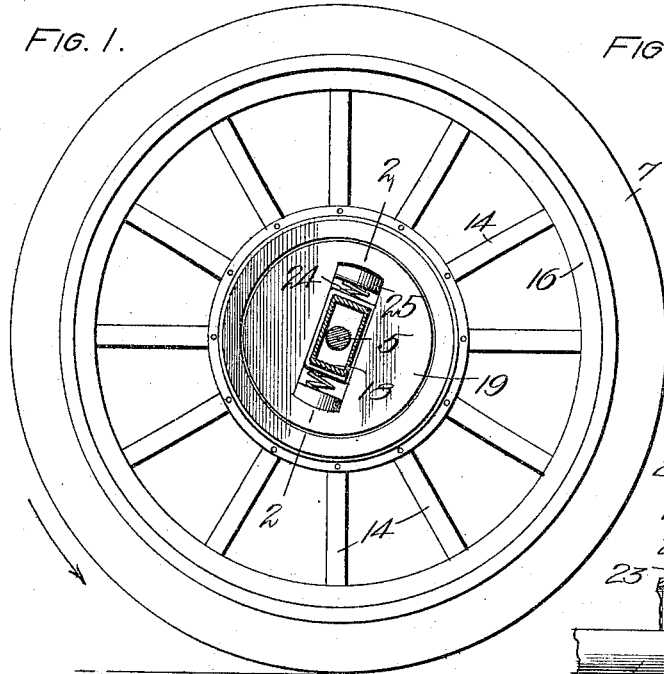
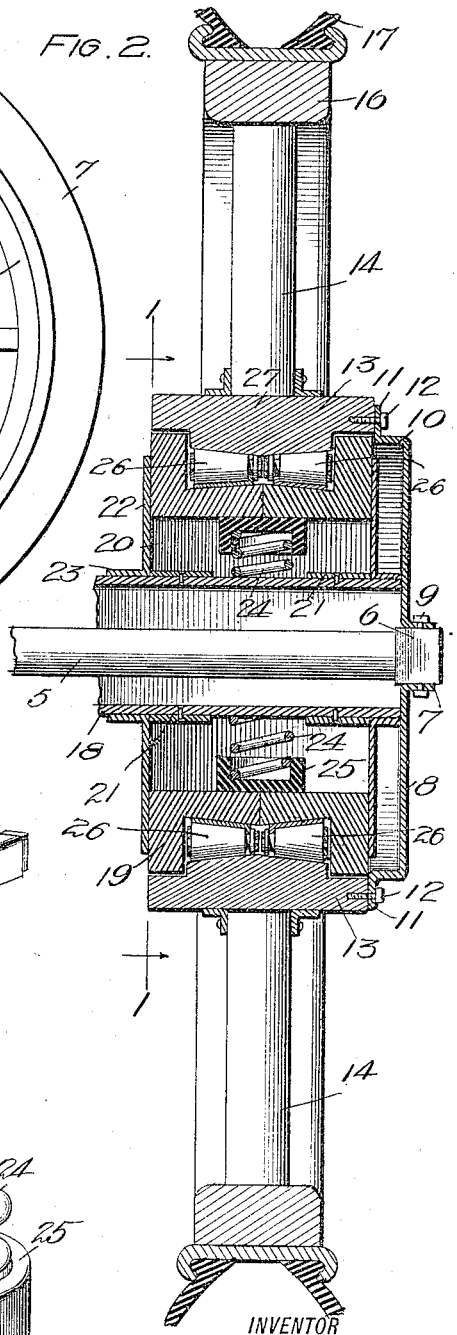
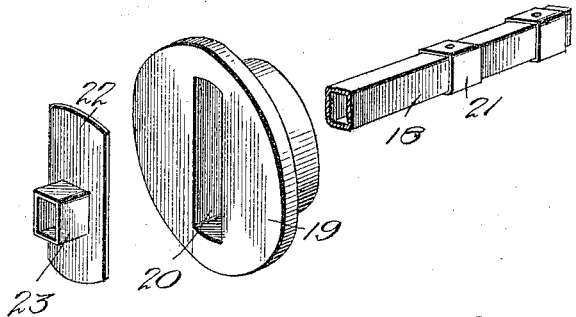
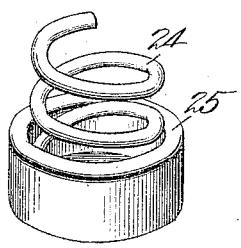
WITNESSES:
INVENTOR
FRANCIS M. CROSS,
BY Munn & Co.
ATTORNEYS

UNITED STATES PATENT OFFICE.

FRANCIS M. CROSS, OF HUNDRED, WEST VIRGINIA.

AUTOMOBILE-WHEEL.

1,181,372.     Specification of Letters Patent.     Patented May 2, 1916.

Application filed March 12, 1915. Serial No. 13,869.

*To all whom it may concern:*

Be it known that I, FRANCIS M. CROSS, a citizen of the United States, and a resident of Hundred, in the county of Wetzel and State of West Virginia, have invented a certain new and useful Improvement in Automobile-Wheels, of which the following is a specification.

This invention relates to an improvement in automobile or other vehicle wheels, and more particularly to that type of wheel in which the resiliency is imparted to the wheel at the hub or center thereof.

One of the principal objects of the invention is to provide an automobile wheel having a stationary hub around which the wheel rim travels, the hub being provided with means for imparting resiliency to the wheel.

Another object of the invention is to provide an automobile wheel having an outer wheel portion or rim fixed to a driving axle, and having a hub portion disposed between the outer wheel and axle, means being provided whereby the hub portion is maintained stationary while the outer wheel portion and axle revolve relatively thereto, means being further provided for taking up road shocks and for allowing movement of the outer wheel portion and axle laterally relative to the hub portion incident to those shocks.

Still another object of the invention is to provide a wheel of the class described which will be extremely simple, durable, efficient in operation, and inexpensive to manufacture.

With these and other objects in view which will become apparent as the description proceeds, the invention resides in the construction, combination, and arrangement of parts hereinafter more fully described and claimed, and illustrated in the accompanying drawings in which like characters of reference indicate like parts throughout the several figures, of which—

Figure 1 represents an inside elevational view of a wheel constructed according to my invention, a portion being shown in section, the section being taken on the line 1—1 of Fig. 2; Fig. 2 represents a detail sectional view of a wheel constructed according to my invention, the section being taken on the plane indicated by the line 2—2 of Fig. 1; Fig. 3 represents a perspective view of the housing of one of the hub plates and one of the retaining plates, showing them in spaced position; Fig. 4 represents a perspective view of one of the springs provided with its resilient socket.

Referring more particularly to the drawings, at 5 is indicated a driving axle which may be driven from the motor of the vehicle to which the wheel is attached through the medium of the ordinary transmission. The outer end of the axle is squared as at 6, and to this squared portion is secured the central rectangularly flanged portion 7 of a plate or disk 8. The central flange 7 is secured by means of set screws 9 or some other suitable fastening elements to the square end 6 of the axle. The periphery of plate 8 is provided with an inwardly extending flange 10 which terminates in an outwardly extending flange 11. The latter is secured by means of suitable fastenings 12 to the inner rim 13 of the wheel. This rim carries the spokes 14 to which the outer rim or felly 16 carrying the tire 17 is secured.

A rectangular boxing or casing 18 is secured in any suitable manner to the body of the vehicle, and axle 5 extends through this casing. The casing is of a depth much greater than the thickness of the axle so that the latter may move laterally or rather may move up and down within the casing. At its outer end the casing bears against the inner face of flange 8. A pair of oppositely arranged circular hub plates 19 are provided, and these hub plates are provided with rectangular slots or openings 20 through which the casing 18 projects. The openings 20 are of a depth greater than the height of casing 18 so that the latter may move up and down within the hub plates. Surrounding the casing or boxing are the spaced bands or shoes 21 which bear against the sides of openings or slots 20 so as to provide a bearing for the casing. In order that the hub plates 19 may be maintained against each other, and in order that dust and dirt may be kept out of the slot 20, I provide the retaining plates 22. These plates are substantially rectangular, and are provided with central rectangular openings whereby the plates may be fitted upon the casing 18. Laterally extending flanges 23 surround the openings in plates 22 and engage upon the walls of the casing. Any suitable means may be provided for maintaining the plates 22 upon the casing in immovable manner. The plates are so disposed as to bear against the outer faces of the hub plates 19 in the manner indicated in Fig. 2. The plates do not, however, engage the hub plates so tightly as to prevent movement of the casing relatively to said hub plates.

Disposed on opposite sides of the casing, or rather, above and below the same, are the springs 24. These springs at their inner ends bear against the casing and at their outer ends are disposed in resilient sockets 25 made of rubber or some other suitable resilient material. These sockets rest respectively against the ceiling and floor of the recess in which the housing works, and are adapted to be engaged by the casing before either of the springs becomes entirely compressed, so that no shocks incident to the entire compression of the springs will be experienced. Although one spring has been shown as being placed on each side of the casing, the number of springs used is of course optional.

Each hub plate at its inner edge as shown in Figs. 2 and 3, is annularly rabbeted, and these rabbets combine to form a peripheral channel extending around the hub. The channel forms a race-way for a plurality of roller bearings 26 carried one by each of the hub plates. The inner rim 13 is provided centrally and interiorly with an annular ridge or rib 27 extending within the raceway and bearing against the rollers 26. In this manner an anti-friction bearing is provided between the outer wheel portion and the hub, so that the former may rotate relatively to the hub.

In use, the housing 18 is so connected to the vehicle, that at its lower end it will be inclined forwardly, as shown in Fig. 1, so that any shocks experienced by the contact of the tire with obstacles in the roadway, will result in a direct thrust against the springs 24, as will be readily understood.

From the foregoing it will be understood that the driving axle and outer wheel portion rotate relatively to the casing and hub, and that at the same time the wheel, hub, and axle may all move up and down relatively to the casing in following the contour of the roadway, all shocks being absorbed by the action of the springs 24.

Although I have described the preferred embodiment of my invention, I may desire to make such changes in the construction, combination, and arrangement of parts thereof, as do not depart from the spirit of the invention and the scope of the appended claims.

I claim:—

1. A device of the class described comprising a driving axle, a plate fixedly connected thereto, an inner wheel rim fixed to the plate, a felly carried by the inner rim, a casing adapted to be secured to a vehicle body, said driving axle extending through said casing and adapted to move within the same relatively to said casing, a pair of hub plates oppositely arranged and provided with registering elongated openings through which the casing extends, said casing adapted to move in said registering openings relatively to the hub plates, retaining plates fixed on the casing and engaging the hub plates whereby to maintain them together and whereby to prevent entrance of foreign matter into the registering openings in the hub plates, bearings carried by the casing and engaging against the hub plates within the openings therein, resilient springs disposed above and below the casing and bearing at their inner ends against said casing, sockets against which the outer ends of the springs engage, said sockets bearing against the hub plates within the openings therein, said hub plates being rabbeted exteriorly whereby to provide a peripheral channel or raceway, roller bearings disposed in the raceway, said inner wheel rim engaging against said roller bearings whereby the inner wheel rim and felly may rotate relatively to the hub plates, substantially as described.

2. A device of the class described comprising a driving axle, an inner wheel rim fixed with relation to the axle and surrounding the same at a distance therefrom, an outer wheel rim carried by the inner wheel rim, a casing adapted to be connected to the body of a vehicle, said driving axle extending through said casing and being adapted to move within the casing, a hub provided with an opening through which the casing extends, said casing adapted to move relatively to the hub within the opening, resilient means disposed on opposite sides of the casing between the same and the hub, antifriction bearings disposed between the hub and inner wheel rim, retaining plates carried by the casing and embracing the hub between them, and shoes surrounding the casing between the retaining plates and bearing against the walls of the opening in the hub.

FRANCIS M. CROSS.

Witnesses:
James G. Toothman,
A. D. Ayers.